United States Patent
Werner et al.

[15] 3,677,151
[45] July 18, 1972

[54] ELECTRONIC EXPOSURE TIME MEASURING CIRCUIT WITH TIME INDICATOR AND SHUTTER CONTROL MEANS

[72] Inventors: Nickel Werner, Sinn, Germany; Christopoulos Nikolaos, Piraus, Greece

[73] Assignee: Ernst Leitz GmbH, Wetzlar, Germany

[22] Filed: Jan. 11, 1971

[21] Appl. No.: 105,574

[30] Foreign Application Priority Data

Feb. 11, 1970 Germany....................P 20 06 025.07

[52] U.S. Cl. ........................95/10 CE, 95/10 CT, 95/53 EA
[51] Int. Cl. ...................G03b 17/18, G03b 9/62, G03b 7/08
[58] Field of Search ....................................95/10 CT, 10 CE

[56] References Cited

UNITED STATES PATENTS 3,592,113  7/1971  Wasielewski........................95/10 CT

*Primary Examiner*—Samuel S. Matthews
*Assistant Examiner*—Russell E. Adams, Jr.

[57] ABSTRACT

A combined electronic exposure time measuring device with time indicator and shutter control means. The shutter control means is operated in dependence on the voltage level of a capacitor, and electronic means are provided for amplifying the capacitor voltage immediately at the beginning of the measurement during a fraction of the exposure time to be expected. The voltage thus reaches quickly a comparison level and the pulse obtained thereby is used for stopping the indicating device and also for switching the amplification to a ratio of 1:1. Thereafter, the voltage level approaches slowly again the comparison level and the second pulse obtained is used for controlling the shutter and bringing the circuit back to its starting condition.

4 Claims, 2 Drawing Figures

3,677,151

ELECTRONIC EXPOSURE TIME MEASURING CIRCUIT WITH TIME INDICATOR AND SHUTTER CONTROL MEANS

BACKGROUND OF THE INVENTION

The invention relates to electronic light measuring circuits having a time indicating stage. More particularly, it relates to light measuring circuits for establishing the exposure time of photographic cameras which also operate a shutter control mechanism.

Devices of the above type are well known in the art. Usually they comprise a photoelectric detector wherein a current is generated in dependence on the brightness of the impinging light. The current is fed to a capacitor and in dependence on the rising voltage level of this capacitor the camera shutter is operated and the exposure time to be expected under the prevailing light conditions is indicated. Such a device may, for example, be employed when making photographs in connection with a microscope.

But it is also well known that the exposure time may turn out to be very long, depending on the density of the object, on the speed of the film etc. Exposure times of one hour or longer are encountered quite often in microphotography. Since, however, in known devices the exposure time is indicated synchronously with the duration of the exposure time, the operator can only at the end of the exposure time read from the indicating device what the exposure time actually has turned out to be. He is not in a position to judge at the beginning how long the exposure time is going to be.

It is therefore an object of the present invention to provide a light measuring and shutter control device which measures the exposure time much faster than this period of time actually is so that the length of the exposure time to be expected may be read from the indicator long before the exposure time has actually come to the end.

SUMMARY OF THE INVENTION

The invention is based on the fact that the charging of a capacitor with a constant current causes a linear rise of the voltage level of the capacitor. If a capacitor is connected to a photoelectric detector the capacitor will be charged in accordance with the output current of the detector. In an operational amplifier the voltage level of the capacitor may be compared to a comparison voltage which has been established previously in dependence on the speed on the film used. When the voltage of the capacitor reaches the value of the comparison voltage a pulse is obtained from the operational amplifier and this pulse may be used, for example, for stopping a time indicating device and for directly closing the photographic shutter in an automatic camera.

The pulse will, of course, be obtained more quickly when the light intensity impinging on the photoelectric detector is higher, and the pulse will appear later when the light intensity is lower.

As has been mentioned before, it is the particular disadvantage of such a device, when the pulse is also used for stopping an indicating device, that the reading will only appear at the end of the exposure time, i.e. after the exposure time is all over.

In order to overcome this disadvantage it is the basic idea unterlying the invention to first perform the measurement at a very high speed within a fraction of the actual exposure time and then to control the camera shutter at normal speed, in dependence on the prevailing light conditions.

To this end, means are provided which very highly amplify the voltage level of the capacitor in the beginning of the measurement so that the level of the comparison voltage is reached, for example, in one five-hundredth of the time which would be needed in no amplification would take place. Consequently, after one five-hundredth of the exposure time a pulse will be obtained from the output terminal of the comparison stage and this pulse is used for stopping the indicating device from which the exposure time to be expected may be read. The indicating device is, of course, designed to indicate the time intervals, e.g. the seconds and minutes, at a higher speed than normal. More precisely, it must indicate the time intervals at a speed which corresponds exactly to the amplification ratio of the current. If, for example, the capacitor voltage is amplified 500 times, the indicating device must indicate 1 second in one five-hundredth of a second. It is of minor significance whether the indicator indicates the time in an analogous manner or whether it presents the reading digitally.

Further, the first pulse is also used for reducing the degree of the amplification to a ratio of 1:1 so that from thereon the voltage supplied to the comparison stage increases only in direct proportion to the rising voltage of the capacitor. At a much later time, exactly 499 times later than the time period needed for reaching the comparison voltage the first time, this comparison voltage is reached a second time and a second pulse is obtained from the output terminal of the amplifier. The second pulse is then used for closing the camera shutter and also for bringing the whole circuit back to its starting condition, i.e. for shunting the capacitor and for switching the amplifier back to its high ratio of amplification.

BRIEF DESCRIPTION OF THE DRAWINGS

The invention will be more readily comprehended and more details will become apparent from the following description when taken in conjunction with the appending drawings, wherein.

DESCRIPTION OF THE PREFERRED EMBODIMENT

Figure 1:
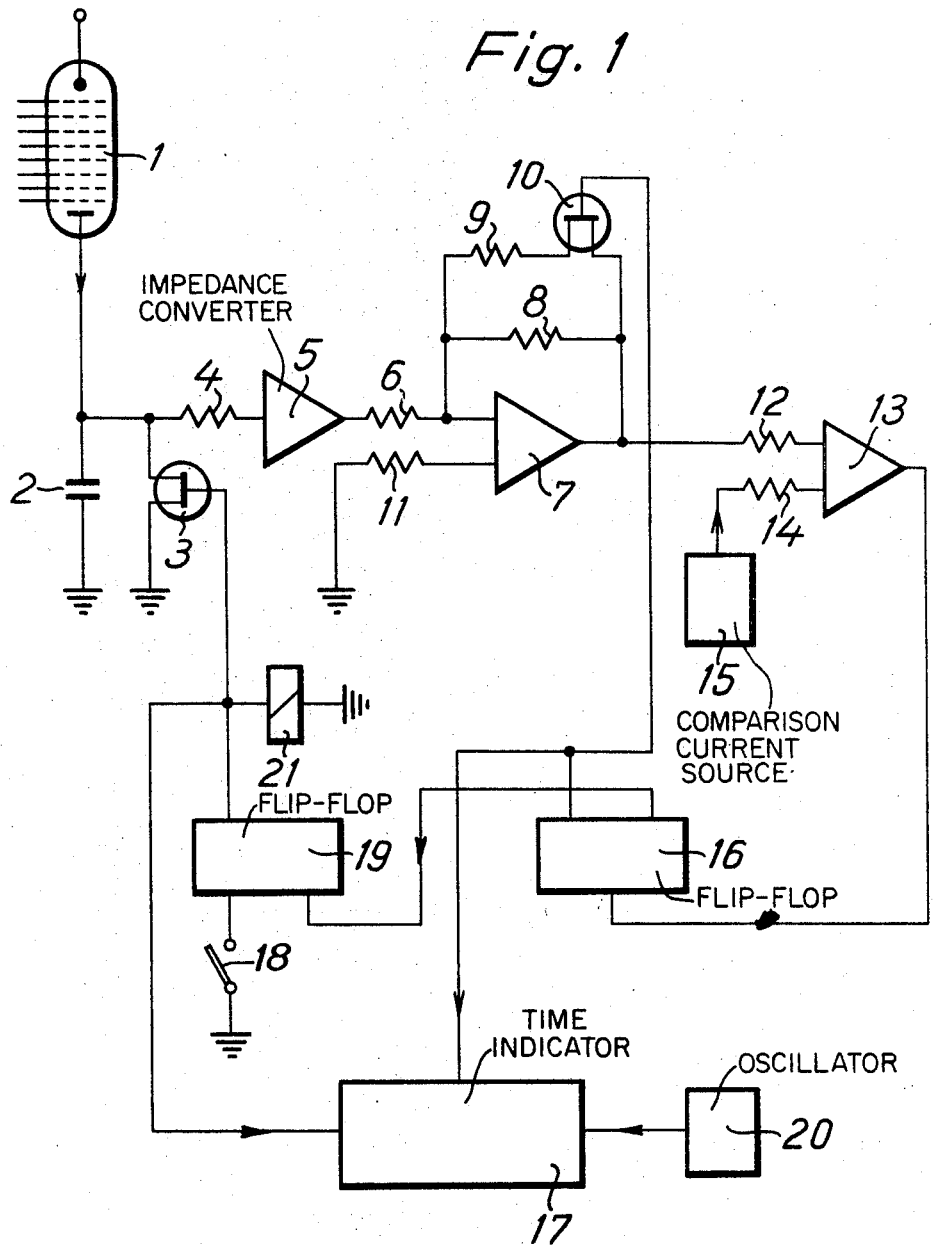
FIG. 1 shows the electric circuit of an embodiment of the invention.

Referring now to FIG. 1, the circuit comprises a photomultiplier 1 as the photoelectric detector connected to a capacitor 2.

The latter is charged by the multiplier when a field-effect transistor 3, connected in parallel to the capacitor, is blocked.

The capacitor is connected to an impedance converter 5 by way of an ohmic resistor 4. The output terminal of the converter 5 is connected to the inverting input terminal of an operational amplifier 7 through an ohmic resistor 6. In the feedback circuit of the operational amplifier 7 are provided two ohmic resistors 8 and 9 in parallel to one another. The resistor 9 may be switched on and off by means of a field-effect transistor 10. The ratio of the resistance values of the resistors 8 and 9 relative to one another are so chosen that the amplification is high when the resistor 8 is the only one effective.

The non-inverting input terminal of the operational amplifier 7 is connected to the ground by way of a balancing resistor 11. The output terminal of the operational amplifier 7 is connected to the non-inverting input terminal of an additional operational amplifier 13 by way of an ohmic resistor 12. To the inverting input terminal of the amplifier 13 is a comparison voltage conducted from a current source 15 through an ohmic resistor 14. The resistance values of the resistors 6 and 11 are substantially equal, and so are the resistance values of the resistors 12 and 14. The input terminal of the amplifier 13 is connected to a flip-flop 16, one output terminal thereof being connected to the filed-effect transistor 10 and to a time indicator 17. The other output terminal of the flip-flop 19 which by way of its second input terminal and a starting contact is connected to the battery. The output terminal of the flip-flop 19 is connected to the base of the field-effect transistor 3 and also to the time indicator 17. The latter is operated by an oscillator 20 at a speed which accelerates the time indication in correspondence to the high amplification chosen for the amplifier 7. If the high amplification ratio is, for example, 500:1 the indicating device must be adjusted to indicate 1 second in one five-hundredth of one second and 1 minute in one five-hundredth of one minute. The output terminal of of the flip-flop 19 is, further, in connection with an electric/mechanical means 21 which controls the mechanical elements of the camera shutter (not shown).

The circuit operates in the following manner: Upon closing of the starting contact 18 the flip-flop 19 is tripped into a state which causes the field-effect transistor 3 to be blocked and the indicating device 17 to start indicating the time intervals. It also activates the means 21 so that the camera shutter is opened. By the current supplied by the photomultiplier 1 the capacitor is now charged. The voltage level of the capacitor, after having been converted in the impedance converter 5, is amplified at a ratio depending on the ratio of the resistance values of the ohmic resistors 8 and 6. After having been amplified the voltage is conducted to the operational amplifier 13. When the level of the amplified voltage reaches the level of the comparison voltage a pulse is obtained at the output terminal of the amplifier. This pulse shifts the flip-flop 16 (FIG. 1) to its other state whereby the field-effect transistor 10 becomes conductive and the digital indication device is stopped.

The amplification ratio of the amplifier 7 is now determined practically by the ratio of the resistance values of the ohmic resistors 9 and 6. This ratio is substantially 1:1. The voltage level of the voltage supplied to the amplifier 13 therefore decreases sharply and it rises again only in direct proportion to the increase of the voltage level in the capacitor 2. When this voltage level reaches the level of the comparison voltage for the second time, a second pulse is generated by the amplifier 13. This pulse shifts the flip-flop 16 again. Thereby the flip-flop 19 causes the field-effect transistor 3 to become conductive again while the transistor 10 is again blocked.

By tripping the flip-flop 19 the means 21 is activated which now closes the camera shutter. After the reading of the time indicator 17 has been brought back to zero the device is ready for the next operation.

Figure 2:
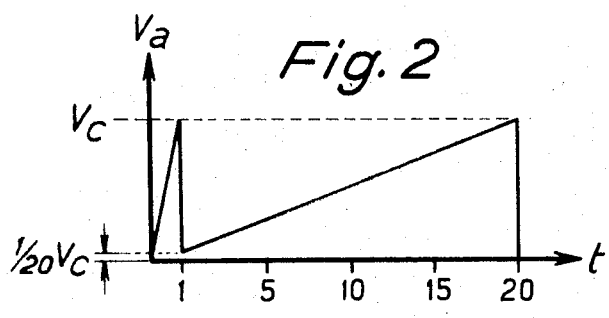
FIG. 2 illustrates the rise of the voltage supplied to the comparison stage.

FIG. 2 shows in a diagram the rise and fall of the voltage $V_a$ supplied to the comparison stage, i.e. to the operational amplifier 13. In this diagram, however, the high amplification ratio of the amplifier 7, which in the reduction of the invention to practice has been chosen to be 500:1, is in this diagram only 20:1. This is done for practical reasons only because it would be difficult to illustrate the rise and fall of the voltage clearly on a 500:1 scale in the drawing.

From FIG. 2 it will be recognized that the voltage $V_a$ supplied to the amplifier 13 starts at zero. Owing to the high amplification ratio of 20:1 it rises quickly in the time interval $1t$ to the level of the comparison voltage $V_c$. Caused by the pulse generated by the amplifier 13 upon this first reaching of the comparison voltage level $V_c$, the amplification ratio is stepped down to a ratio of 1:1 and the indicating device is stopped. From the latter may now be read the total length of the exposure time to be expected under the prevailing light conditions. Moreover, the voltage $V_a$ supplied to the amplifier 13 decreases abruptly. But it does not fall back to zero but to a potential which is one-twentieth of the comparison voltage level $V_c$.

From there it starts to increase again, but this time which an amplification ratio of 1:1 in direct proportion to the increasing voltage level of the capacitor 2. 19 time intervals later the voltage $V_a$ reaches the comparison voltage level $V_c$ for the second time whereupon a second pulse is generated by the amplifier 13. As described before this second pulse is used for closing the camera shutter and for transforming the whole device to its original state so that it may be used for the next exposure time measurement and shutter control operation.

What is claimed is:

1. An electronic exposure time measuring circuit with time indicator and camera shutter control means for opening a camera shutter, indicating the exposure time to be expected and closing the camera shutter at the end thereof, said device comprising
   a. a photoelectric detector (1) in line with
   b. a capacitor (2);
   c. amplifying means (7) for amplifying the voltage level of the capacitor, said amplifying means being switchable between a high ratio of amplification and a ratio of 1:1;
   d. a comparison stage (13) to which the amplified voltage is supplied for comparison with a pre-established comparison voltage, said comparison stage generating a pulse when the level of said amplified voltage reaches the level of said comparison voltage;
   e. electronic control means (16, 19) connected to said comparison stage and being operable in dependence on the pulse generated by said comparison stage, said control means switching the amplification ratio from the high ratio to the ratio of 1:1 upon receiving a first pulse and switching it back upon receiving a second pulse;
   f. a time indicator (17) connected to said control means for indicating the exposure time to be expected at a speed which corresponds to the high amplifying ratio of said amplifying means, said indicating device being started when said measuring circuit is put into operation, and being stopped by said control means when receiving said first pulse;
   g. a means (21) for controlling the mechanical elements of the camera shutter, said means being put into operation when said circuit is started to measure the exposure time and said means being put out of operation by said control means when receiving said second pulse.

2. An electronic exposure time measuring circuit with time indicator and camera shutter control device as claimed in claim 1, wherein said time indicator (17) is a digitally indicating device.

3. An electronic exposure time measuring circuit with time indicator and camera shutter control device as claimed in claim 1, wherein a field-effect transistor (3) is connected in parallel to said capacitor (2), said transistor being switchable into its non-conductive state when said circuit is put into operation and into its conductive state by said control means (19) when receiving said second pulse.

4. An electronic exposure time measuring circuit with time indicator and camera shutter control device as claimed in claim 1, wherein said amplifying means (7) includes a feedback circuit comprised of two ohmic resistors (8, 9) and a field-effect transistor, one of said resistors (9) being alternately switchable on and off by means of said field-effect transistor (10) which is controlled by said control means (16) for changing said amplification ratio.

* * * * *